(12) United States Patent
Fruhauf

(10) Patent No.: US 7,690,570 B2
(45) Date of Patent: *Apr. 6, 2010

(54) METHOD AND APPARATUS FOR A USB AND CONTACTLESS SMART CARD DEVICE

(75) Inventor: Serge F. Fruhauf, Saratoga, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,528

(22) Filed: Apr. 10, 2007

(65) Prior Publication Data

US 2007/0175994 A1  Aug. 2, 2007

Related U.S. Application Data

(63) Continuation of application No. 10/653,765, filed on Sep. 3, 2003, now Pat. No. 7,237,719.

(51) Int. Cl.
*G06K 7/08* (2006.01)

(52) U.S. Cl. .................. 235/451; 235/492

(58) Field of Classification Search .......... 235/380, 235/441, 451, 487, 492, 440
See application file for complete search history.

(56) References Cited

U.S. PATENT DOCUMENTS

| 5,594,233 | A  | * | 1/1997  | Kenneth et al.  | 235/492  |
|-----------|----|---|---------|-----------------|----------|
| 5,929,414 | A  | * | 7/1999  | Saitoh          | 235/380  |
| 5,973,598 | A  |   | 10/1999 | Beigel          |          |
| 6,168,077 | B1 | * | 1/2001  | Gray et al.     | 235/375  |
| 6,439,464 | B1 | * | 8/2002  | Fruhauf et al.  | 235/492  |
| 6,577,229 | B1 | * | 6/2003  | Bonneau et al.  | 340/10.41|
| 6,899,277 | B2 | * | 5/2005  | Kawano et al.   | 235/492  |
| 6,942,156 | B2 |   | 9/2005  | Ohta et al.     |          |
| 7,178,737 | B2 | * | 2/2007  | Ohyama          | 235/492  |
| 7,237,719 | B2 |   | 7/2007  | Fruhauf         |          |
| 7,246,750 | B2 | * | 7/2007  | Cho             | 235/492  |
| 7,520,441 | B2 | * | 4/2009  | Cho             | 235/492  |
| 2002/0003168 | A1 |   | 1/2002 | Takabayashi    |          |
| 2002/0170975 | A1 | * | 11/2002 | Kawano et al. | 235/492  |
| 2003/0075601 | A1 | * | 4/2003 | Yagi et al.    | 235/382  |
| 2003/0112611 | A1 |   | 6/2003 | Nishizawa et al.|         |

(Continued)

FOREIGN PATENT DOCUMENTS

EP  1079328 A2  2/2001

(Continued)

*Primary Examiner*—Daniel A Hess
*Assistant Examiner*—Paultep Savusdiphol
(74) *Attorney, Agent, or Firm*—David V. Carlson; Lisa K. Jorgenson

(57) ABSTRACT

An apparatus for a Universal Serial Bus (USB) and wireless smart card is provided. The apparatus includes a mode detection circuit, a switching block, a controller, an antenna, and a wired interface. Furthermore, an apparatus for a triple-mode smart card is also provided herein. The apparatus for the triple mode smart card includes a mode detection circuit, a switching block, a controller, an antenna, and a wired interface. The apparatus for the triple mode smart card operates in one of a wireless mode, a USB mode and an International Standards Organization 7816 mode or other wired mode. Furthermore, the apparatus for any of these smart cards could operate in both the wireless and wired mode(s) without conflict, and without switching power off and on to change configuration.

29 Claims, 12 Drawing Sheets

U.S. PATENT DOCUMENTS

| | | | |
|---|---|---|---|
| 2004/0232248 A1* | 11/2004 | Cho | 235/492 |
| 2007/0012785 A1* | 1/2007 | Ohyama | 235/492 |
| 2007/0200003 A1* | 8/2007 | Deprun et al. | 235/492 |
| 2007/0243901 A1* | 10/2007 | Cho | 455/558 |

FOREIGN PATENT DOCUMENTS

| | | | |
|---|---|---|---|
| WO | 9708929 | A2 | 3/1997 |
| WO | 9921119 | A1 | 4/1999 |
| WO | 9934326 | A1 | 7/1999 |
| WO | 9959098 | A1 | 11/1999 |
| WO | 0231762 | A1 | 4/2002 |

\* cited by examiner

METHOD AND APPARATUS FOR A USB AND CONTACTLESS SMART CARD DEVICE

CROSS-REFERENCE TO RELATED APPLICATION

This application is a continuation that claims priority under 35 U.S.C. § 120 to U.S. patent application Ser. No. 10/653,765, issuesd as U.S. Pat. No. 7,237,719 on Jul. 3, 2007, entitled "METHOD AND APPARATUS FOR A USB AND CONTACTLESS SMART CARD DEVICE," filed Sep. 3, 2003, assigned to the same assignee as the present application, and incorporated herein by reference in its entirety.

TECHNICAL FIELD

The present disclosure relates generally to smart card ("SC") devices, and in particular but not exclusively, relates to a smart card device supporting both wireless and wired modes.

BACKGROUND INFORMATION

Smart cards are plastic cards having an embedded integrated circuit ("IC"). That IC may be a logic circuit with its associated memories, a controller with its associated memories and software, or other type of intelligence. The IC of an SC is typically coupled to external pads, which allow the SC to communicate or perform transactions with external devices using some type of protocol. These external devices can include an SC reader, a host personal computer ("PC"), SC adapters and connectors, and the like.

The mechanical and electrical specifications of SCs are published by the International Standard Organization ("ISO") and other organizations. For instance, the ISO 7816 protocol supports "wired" or "contact modes" for SCs. In the contact mode, the SC physically contacts with the SC reader such that both the SC and SC reader can communicate with each other. The ISO 7816 protocol uses a smart card that has external pads including at least a voltage supply pad ("$V_{cc}$"), a ground pad ("GND"), a reset pad ("RST"), a clock pad ("CLK"), and an input/output pad ("I/O"). This ISO 7816 protocol is characterized by an answer-to reset (ATR) sequence when a power-on process or reset is applied in the smart card.

On the other hand, "wireless" or "contact-less" SC standards cover a variety of protocol types such as ISO 10536 (Close-coupled cards), ISO 14443 (Proximity cards), and ISO 15693 (Vicinity cards). Based on these contact-less standards, the contact-less SC and contact-less SC reader communicate with each other without physical connection by placing the SC closely to the SC reader. There is a small loop or antenna inside the contact-less SC, which makes electromagnetic induction contact with the SC reader. After the contact-less SC is placed closely to the contact-less SC reader, the contact-less SC will be activated by the electromagnetic field emitted from the SC reader.

In some implementations, the SC is used with the SC reader connected to the host computer through a USB cable. The USB standard has become firmly established and has gained wide acceptance in the PC marketplace. The USB standard was developed in response to a need for a standard interface that extends the concept of "plug and play" to devices external to a PC. It has enabled users to install and remove peripheral devices external to the PC without having to open the PC case or to remove power from the PC (e.g., without having to "reboot"). The USB standard provides a low-cost, high-performance serial interface that is easy to use and readily expandable, and is supported by an increasing number of SCs that are available in the marketplace. Based on the USB standard, the USB cable connected between the USB device and the host computer includes a voltage supply wire ("VBUS"), a ground wire ("GND"), a D-minus wire ("D−"), and a D-plus wire ("D+").

A single mode smart card can separately support only one of a contact protocol (e.g., ISO 7816), contact-less protocol (e.g., ISO 14443), or the USB standard protocol. Furthermore, a dual mode smart card has the possibility to switch from an ISO 7816 protocol to a USB protocol or vice versa (such as disclosed in U.S. Pat. No. 6,439,464, assigned to the same assignee as the present application and incorporated by reference herein). The configuration of the smart card is chosen at power-on-reset depending on a hardware mode selection. A contact/contact-less dual mode smart card can operate in ISO 7816 mode or in ISO 14443 mode. Although there is a dual mode smart card available, such as the smart card supporting the USB protocol and the ISO 7816 protocol, or supporting the ISO 14443 protocol and ISO 7816 on the same chip, such kinds of smart cards can support only one mode at a time and not two modes simultaneously, and typically require turning power to the smart card on or off.

BRIEF SUMMARY OF THE INVENTION

An apparatus for a smart card is provided. The apparatus includes an access interface, a mode detection circuit, a switching block, and a controller. The access interface includes an antenna and a wired interface. The mode detection circuit coupled to the access interface detects a wireless communication mode and at least one wired communication mode to the smart card. The switching block coupled to the mode detection circuit sends a set of mode operation signals based on a type of mode detected by the mode detection circuit. The controller coupled to the switching block and the mode detection circuit enables operation of the smart card in a first mode based on the set of mode operation signals, and further enables a change of operation of the smart card to another mode after the first mode.

BRIEF DESCRIPTION OF THE SEVERAL VIEWS OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
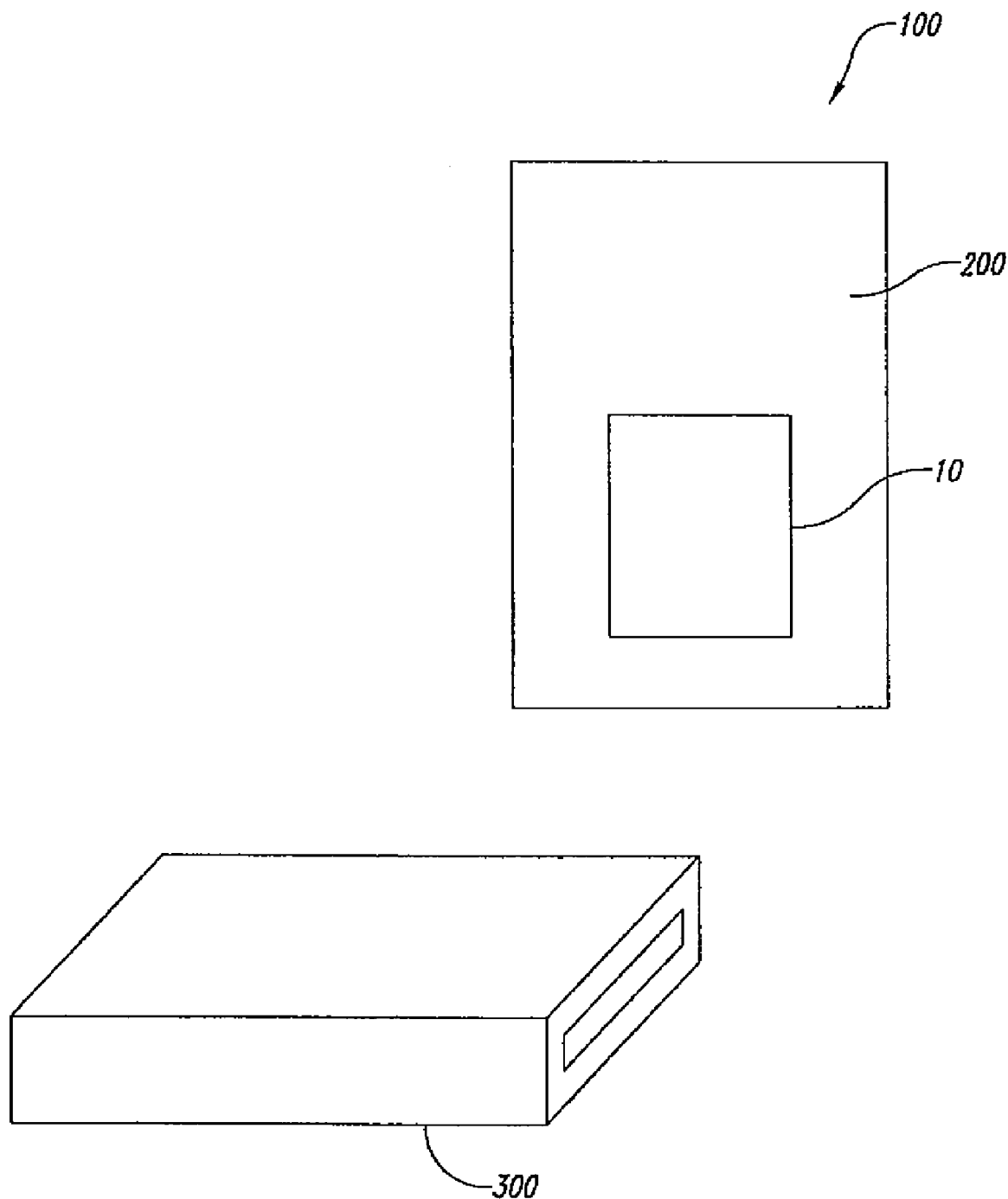
FIG. 1 shows a smart card and a smart card reader.

As an overview, in certain applications, it is desirable to have a contact-less or wireless smart card (a corporate badge, for example) and a USB smart card or other wired-mode smart card (a network or PC access card, for example). Therefore, an embodiment of the invention provides a smart card apparatus to support a wireless mode or a wired mode, such as a USB mode, without conflict. Furthermore, this apparatus can operate in both the wireless mode and wired mode without switching power off and on to change configuration. According to the embodiment of the present invention, the smart card apparatus could decide which mode it shall select and avoid any conflicts between two modes. The contact-less or wireless mode can be detected by placing the smart card apparatus close to the contact-less smart card reader, and the USB mode can be detected by the introduction of the smart card apparatus in a USB plug. The apparatus will first detect if there is a contact-less mode during a power-on-reset process, and if not then, the apparatus further detects if there is a USB mode after the power-on-reset process. After one mode is detected, the apparatus blocks the other mode detection to avoid conflict. However, after the apparatus is stabilized in the detected mode, the apparatus could further release the blocked mode such that the apparatus could subsequently detect and operate in one or both modes as needed.

Moreover, another embodiment of the present invention is also provided for a smart card apparatus that supports a wireless mode, a USB mode or other contact mode without conflict. This embodiment of the smart card apparatus can operate in both the wireless and wired modes without switching power off and on to change configuration. The wireless mode can be detected by placing the smart card apparatus close to the contact-less smart card reader, and the USB mode can be detected by the introduction of the smart card apparatus in a USB plug. The contact mode can be detected by the introduction of the smart card in an ISO 7816 smart card reader, which provides power supply, I/O, CLK and RST signals, or in other type of contact-mode reader.

For example in one embodiment, the smart card detects the USB mode at power-on reset, and blocks the RF detector. The embedded software confirms the USB mode detection, and initializes the smart card with its USB configuration and enables the RF detector again. When the USB mode was detected, a control signal disabled the RF detector and signals generator. When the embedded software completed the USB configuration, it enabled the RF detector and signals generator by setting a register bit. In other words, there is a hardware lock of the detection, and there is a software unlock of the detection in an embodiment.

In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Referring to FIG. 1, an embodiment of a smart card apparatus 10 of the present invention could be embedded in a smart card 100 with a plastic body 200. In this embodiment, the apparatus 10 operates in one of a wireless mode and a wired mode, such as a USB mode, without any conflict during operation. Furthermore, the apparatus 10 could operate in both the wireless mode and the USB mode without switching power off and on to change configuration. The smart card 100 could be activated by a smart card reader 300 by physically contacting the smart card 100 to the smart card reader 300 or by placing the smart card 100 closely to the smart card reader 300, depending on the protocol supported by the smart card reader 300. Of course, the apparatus 10 of an embodiment of the present invention could also be implemented in a subscriber identity module (SIM) card for mobile phone or in other devices.

Figure 2:
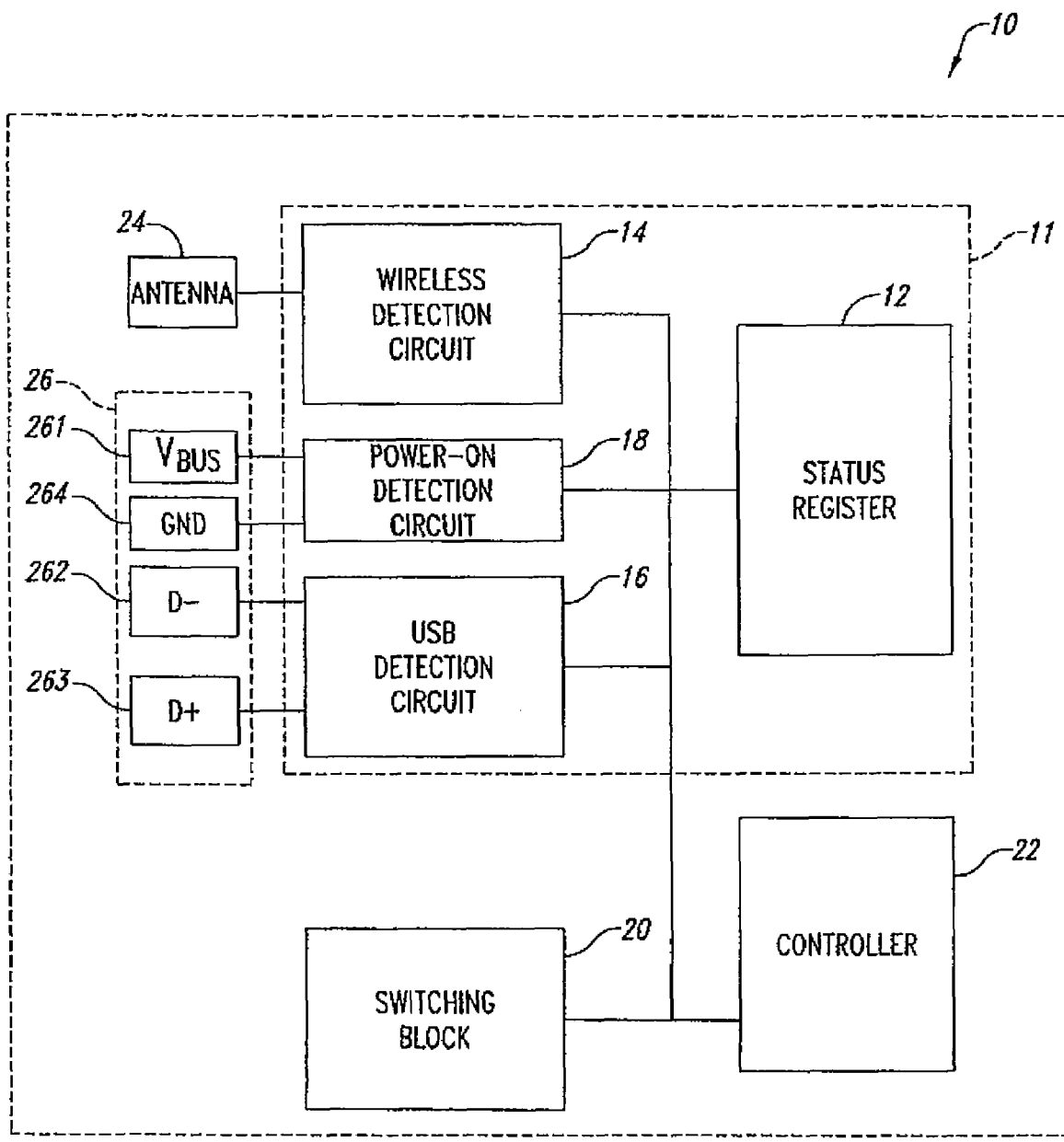
FIG. 2 is a block diagram of a smart card apparatus according to an embodiment of the present invention.

Referring to FIG. 2, an embodiment of the apparatus 10 includes a mode detection circuit 11, a switching block 20, a controller 22, an antenna 24, and a wired interface 26 comprising a plurality of electrical pads. The antenna 24 could receive wireless signals from and transmit response signals to a contact-less smart card reader. The wired interface 26 in one embodiment includes a voltage supply ("$V_{BUS}$") pad 261, a ground ("GND") pad 264, a D-minus ("D–") pad 262, and a D-plus ("D+") pad 263. These pads are in compliance with the USB protocol such that a USB host could access the apparatus 10 through these pads, in one embodiment. The mode detection circuit 11, connected to the antenna 24 and the wired interface 26, could detect and store a set of wireless status signals and a set of USB status signals. The controller 22 and the switching block 20, connected to each other, could operate the apparatus 10 in the wireless mode or the USB mode (while being able to detect a need to transition to the other mode), based on the set of wireless status signals and the set of USB status signals.

The mode detection circuit 11 includes a status register 12, a wireless detection circuit 14, a USB detection circuit 16, and a power-on detection circuit 18. The wireless detection circuit 14 coupled to the antenna 24 generates a wireless power supply signal to the power-on detection circuit 18 and the set of wireless status signals to the status register 12. The power-on detection circuit 18 connected to the wireless detection circuit 14 and the voltage supply pad 261 can generate a power-on signal. When the smart card 100 is placed closely to the contact-less smart card reader, the wireless detection circuit 14 will receive the electromagnetic power and generate the wireless power supply signal to the power-on detection circuit 18. Then, the power-on detection circuit 18 will generate the power-on signal. This power-on signal will also be generated when there is electric power sent through the voltage supply pad 261 to the power-on detection circuit 18 during a wired connection. The USB detection circuit 16 coupled to the power-on detection circuit 18, the D+pad 263, and the D−minus pad 262 generates the set of USB status signals. The status register 12 couples to the wireless detection circuit 14 and the USB detection circuit 16 to store the set of wireless status signals and the set of USB status signals, respectively.

The apparatus 10 decides which mode it shall select and avoids any conflicts between two modes. To avoid such conflict, the apparatus 10 will first detect if there is a wireless mode, and if not, then the apparatus 10 further detects if there is a USB mode or other wired mode. When the smart card 100 is placed closely to the contact-less smart card reader or connected to a USB host, the apparatus 10 will receive electric power from the contact-less smart card reader or from the USB host, and the power-on signal will be generated by the power-on detection circuit 18, as mentioned above. If the mode detection circuit 11 detects a wireless signal through the antenna 24 when the power-on signal is set to a first state, such as "1," the apparatus 10 will operate in the wireless mode. On the other hand, if the wireless signal is not detected by the mode detection circuit 11 when the power-on signal is still in the first state and if the mode detection circuit 11 detects a USB cable connection after the power-on signal goes from the first state to a second state, such as "0," the apparatus 10 will operate in the USB mode. The USB cable connection can be decided through at least one of the D+ pad 263 and the D− pad 262 when the USB cable is connected to the USB host.

Figure 2A:
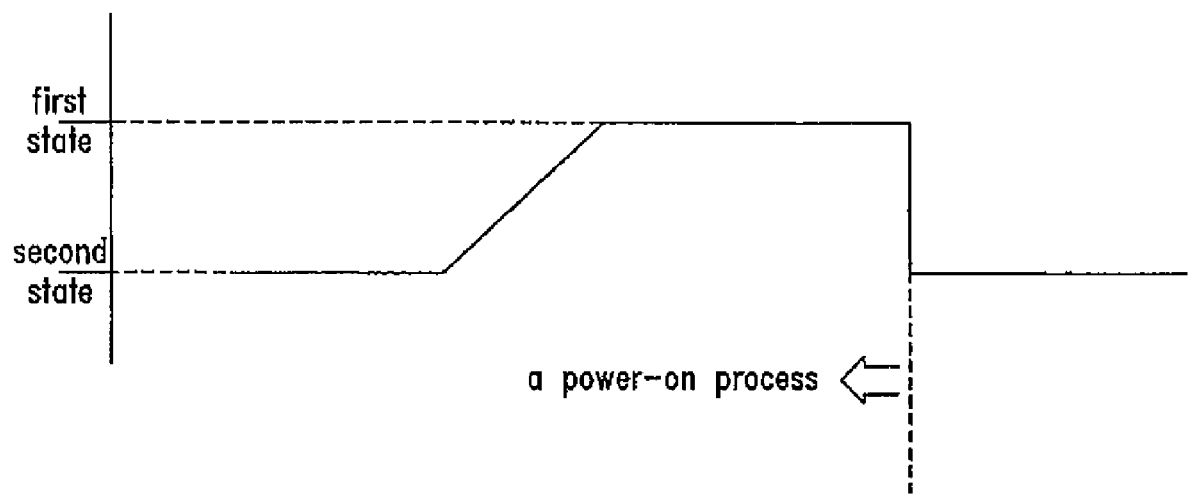
FIG. 2A is a schematic waveform for a power-on signal of an embodiment of the present invention.

Referring to FIG. 2A, the period before the power-on signal goes from the first state to the second state could be defined as a power-on process. That is, the wireless signal will be detected during the predetermined power-on process and the USB cable connection will be detected after the power-on process in an example embodiment.

However, to avoid conflict between those modes, after the first mode, such as the wireless mode, is detected, the second mode detection, such as the USB mode detection, is blocked. There is an option to block the second mode detection until a new power-on-reset of the apparatus 10, or to block the second mode detection during the time to stabilize the apparatus 10 in the first mode and thereafter to release the block to enable the second mode detection if needed. The wireless detection circuit 14 could be blocked by one of the set of USB status signals, and the USB detection circuit 16 could be blocked by one of the set of wireless status signals. When the first mode is stabilized and confirmed, the second mode detection could be enabled again. For example, if the mode detection circuit 11 first detects the wireless mode, then the USB detection circuit 16 is blocked and the apparatus 10 will be configured and be set or reset into the wireless mode. After the apparatus 10 stabilizes in the wireless mode, the mode detection circuit 11 could then enable the USB detection circuit 16 again so that if the smart card 100 is placed in a wired environment, the apparatus 10 can automatically detect the wired environment and transition to that operating mode.

Figure 2B:
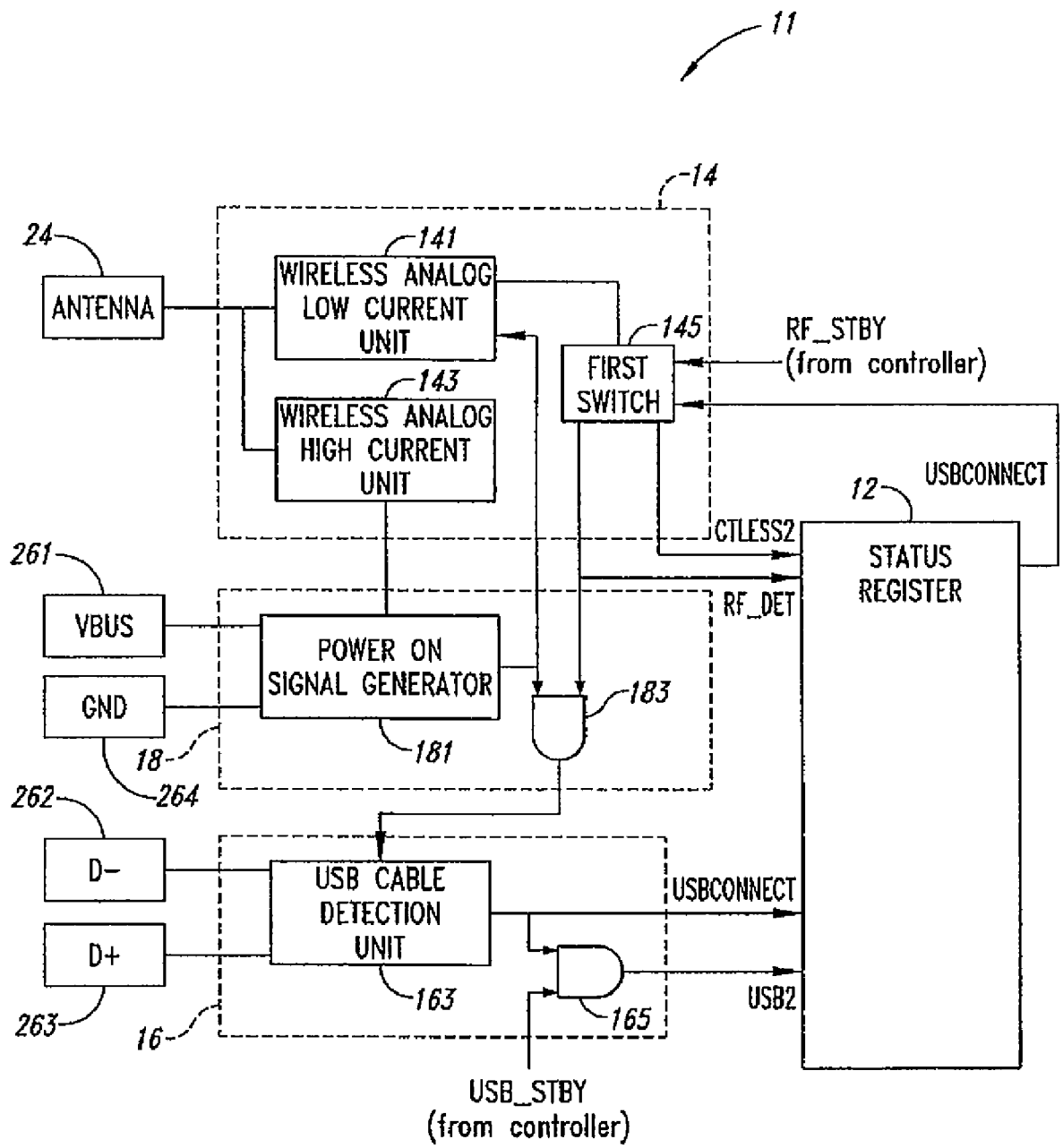
FIG. 2B is a schematic diagram of an embodiment of a mode detection circuit of the smart card apparatus of FIG. 2.

FIG. 2B is a more detailed schematic diagram of an embodiment of the mode detection circuit 11 of FIG. 2. The wireless detection circuit 14 comprises a wireless analog high current unit 143, a wireless analog low current unit 141, and a first switch 145. The wireless analog high current unit 143 couples to the antenna 24 to generate the wireless power supply signal to the power-on detection circuit 18. That is, when the smart card 100 is placed closely to the contact-less smart card reader, the wireless analog high current unit 143 will generate the wireless power supply signal to the power-on detection circuit 18. The wireless analog low current unit 141 coupled to the antenna 24 and the power-on detection circuit 18 generates a wireless detection signal to the first switch 145. The first switch 145 coupled to the wireless analog low current unit 141 generates the set of wireless status signals including a first wireless status signal (hereinafter "RF_DET signal") if a wireless signal was detected and a second wireless status signal (hereinafter "CTLESS2 signal") in another situation to indicate that the wireless interface is enabled while the smart card 100 is in USB mode.

When a wireless signal is detected during the power-on process, the RF_DET signal is set to "1." In this case, the RF_DET signal is provided to the status register 12 by way of the first switch 145 to indicate that the wireless mode is detected. Thereafter, a CTLESS bit in the status register 12 is set to "1," the apparatus 10 will be configured in the wireless mode, the USB detection circuit 16 will be blocked by the RF_DET signal, and then the apparatus 10 launches a vector-reset process to initiate the state of the apparatus 10.

The power-on detection circuit 18 includes a power-on signal generator 181 and a first logic circuit 183. The power-on signal generator 181, coupled to the wireless analog high current unit 143, could receive the wireless power supply signal and generate the power-on signal. Furthermore, the power-on signal generator 181 also couples to the voltage supply pad 261 and generates the power-on signal when it receives the electric power from the voltage supply pad 261 instead of the antenna 24. The power-on signal will be sent to the wireless analog low current unit 141 and the first logic circuit 183, such that the wireless signal will be detected during the predetermined power-on process and the USB cable connection will be detected after the power-on process, as explained above. The first logic circuit 183, coupled to the power-on signal generator 181 and the first switch 145, generates a control signal to the USB detection circuit 16. As mentioned, the USB detection circuit 16 detects the USB cable connection when the USB detection circuit 16 is not blocked by RF_DET signal and after the power-on signal goes from "1" to "0." The control signal will control the USB detection circuit 16 such that it operates only after the predetermined power-on process and when USB mode detection is not blocked. Therefore, the first logic circuit 183 generates the control signal based on the content of the RF_DET signal and the power-on signal.

The USB detection circuit 16 includes a USB cable detection unit 163 and a second logic circuit 165 to generate the set of USB status signals including a first USB status signal and a second USB status signal. The USB cable detection unit 163 coupled to the power-on detection circuit 18, the D− pad 262 and the D+ pad 263, generates the first USB status signal (hereinafter "USBCONNECT signal"). When a USB cable connection is detected from at least one of the D+ pad and the D− pad after the end of the power-on process, the USBCONNECT signal is set to "1." The second logic circuit 165, coupled to the USB cable detection unit 163 and the controller 22, generates the second USB status signal (hereinafter "USB2 signal") if the USB interface is enabled while the smart card 100 is in the wireless mode. The functions of the USB_STBY signal and the RF_STBY signal which are shown in FIG. 2B will be explained later.

Figure 2C:
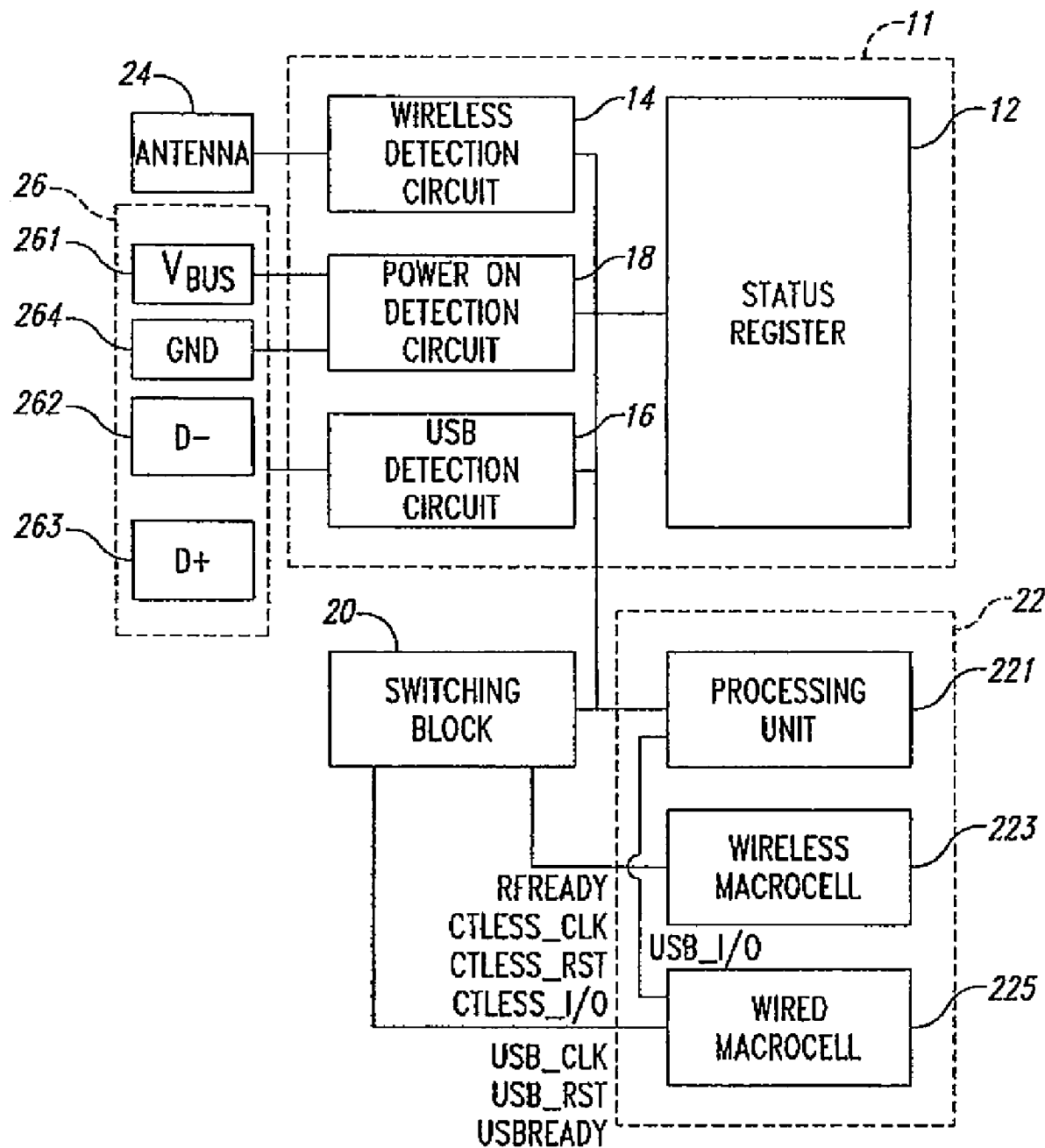
FIG. 2C is a schematic diagram of a switching block and controller of the smart card apparatus of FIG. 2 according to an embodiment of the invention.

FIG. 2C is a more detailed schematic diagram of an embodiment of the controller 22 and the switching block 20. The controller 22 comprises a processing unit 221, a wireless macrocell 223, and a wired or USB macrocell 225. The switching block 20 couples to the wireless macrocell 223 and the wired macrocell 225. The wireless macrocell 223 sends a set of wireless mode operation signals including CTLESS_RST, CTLESS_CLK, and CTLESS_I/O signals to the switching block 20. The set of the wireless mode operation signals is decoded by the wireless analog low current unit 141 from the wireless signals received by the antenna 24, and which are provided by the wireless analog low current unit 141 to the wireless macrocell 223.

The wired macrocell 225 generates a set of USB mode operation signals including USB_RST and USB_CLK signals to the switching block 20. A USB_I/O signal is sent from the wired macrocell 225 to the processing unit 221 via a parallel bus. If the RF_DET signal is set to "1" as indicated by CTLESS=1 in the status register 12 polled by the controller 22, then the switching block 20 transmits the set of wireless mode operation signals to the processing unit 221. On the other hand, if the RF_DET signal is set to "0" (and so CTLESS=0 in the status register 12), then the switching block 20 transmits the set of USB mode operation signals to the processing unit 221.

As mentioned above, after the first mode is detected, the second mode detection will be blocked. When the first mode is stabilized and confirmed, the second mode detection could be enabled again. If the mode detection circuit 11 first detects the wireless mode and sets the RF_DET signal to "1," the USB detection circuit 16 is blocked by such RF_DET signal and the apparatus 10 will be configured and be reset into the wireless mode. After the apparatus 10 stabilizes in the wireless mode, the mode detection circuit 11 could then enable the USB detection circuit 16 again. The controller 22 will send a wired standby signal ("USB_STBY") signal to the USB detection circuit 16 showing that the wired macrocell 225 is placed in a stand-by status during the wireless mode. If at that time there is the USB cable connection and the USBCONNECT signal is set to "1," then second logic circuit 165 sets the USB2 signal to "1" showing that the USB interface (e.g., the wired macrocell 225, the D+ pad 263, and the D− pad 262) is enabled during the wireless mode. In an embodiment, a wireless ready ("RFREADY") signal is also sent from the wireless macrocell 223 to the switching block 20 indicating that there is no conflict to activate the USB interface in wireless mode, prior to switching the switching block 20.

For example, while in wireless mode, the controller 22 polls the USB2 bit in the status register 12. If USB2=1, then the controller 22 checks if there is no wireless data transfer through the contactless interface, to ensure that the current communication interface is not in use. If there is no wireless data transfer, the wireless macrocell 223 sets RFREADY to "1," which causes the switching block 20 to switch the processing unit 221 to the USB or other wired mode. If the smart card 10 later needs to revert back to the wireless mode, the controller 22 checks first if there is no wired data transfer through the USB interface, and if no data, then resets RFREADY and sets USBREADY to switch the switching block 20 to the wireless mode.

On the other hand, if the mode detection circuit 11 first detects the USB cable connection and the USBCONNECT signal is set to "1," the wireless detection circuit 14 is blocked by such USBCONNECT signal and the apparatus 10 will be configured and be set or reset into the USB mode. After the apparatus 10 stabilizes in the USB mode, the mode detection circuit 11 could then enable the wireless detection circuit 14 again. The controller 20 will send a wireless standby ("RF_STBY") signal to the wireless detection circuit 14 showing that the wireless macrocell 223 is placed in a stand-by status during the USB mode. If at that time a wireless signal is detected by the wireless detection circuit 14, then the first switch 145 sets the CTLESS2 signal to "1" showing that the contact-less interface (e.g., the wireless communication path between the antenna 24 and the wireless macrocell 225) is enabled during the USB mode. In an embodiment, a wired ready ("USBREADY") signal is also sent from the wired macrocell 225 to the switching block 20 indicating that there is no conflict to activate the contact-less interface in USB mode, prior to switching the switching block 20.

For example, while in wired mode, the controller 22 polls the CTLESS2 bit in the status register 12. If CTLESS2=1, then the controller 22 checks if there is wired data transfer through the USB interface. If there is no wired data transfer, then the wired macrocell 225 sets USBREADY=1, which causes the switching block 20 to switch the processing unit 221 to the wireless mode.

Figure 3:
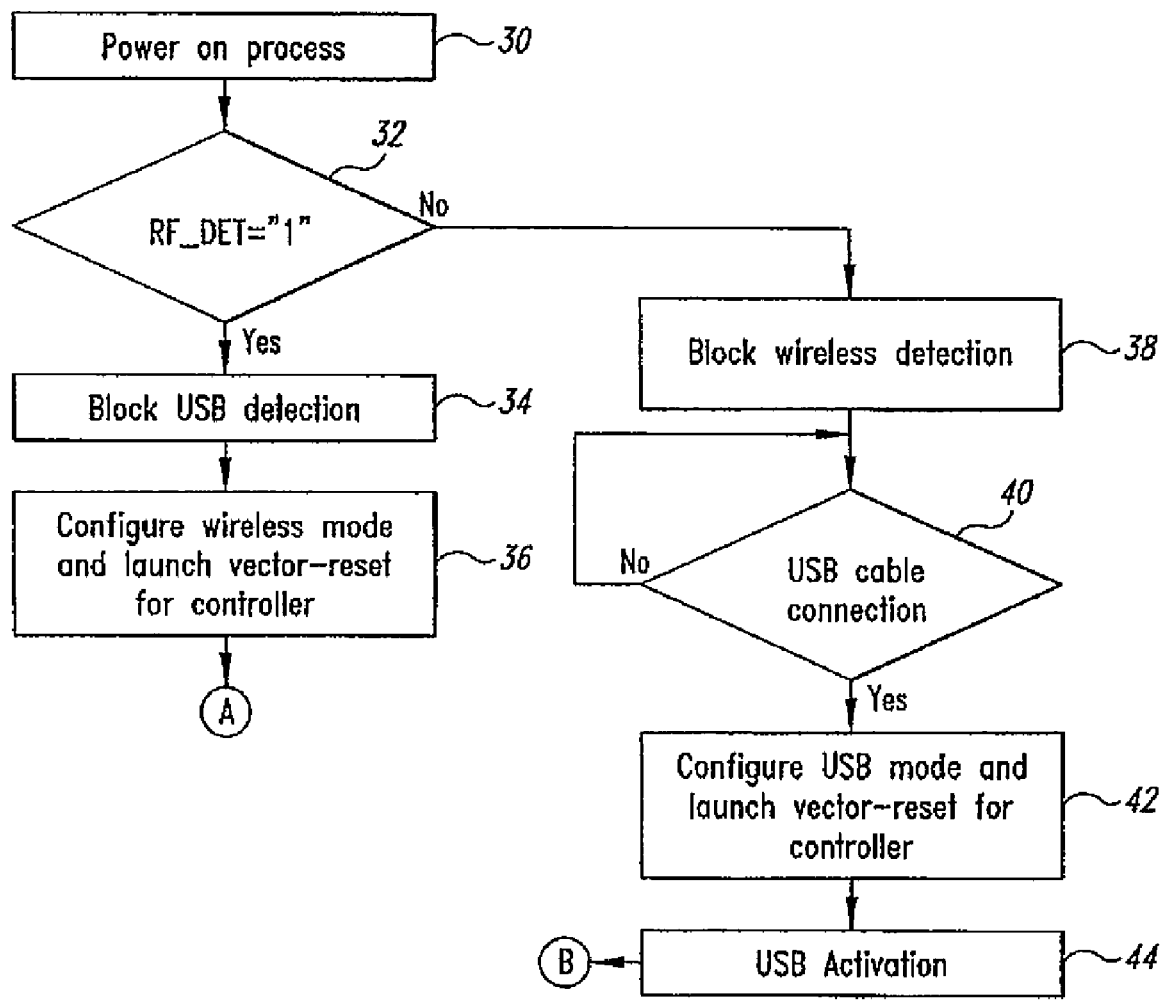
FIG. 3 is a flowchart of an embodiment of a method of operating the smart card apparatus of FIG. 2.

A method according to an embodiment of the present invention will now be discussed while referring to FIG. 3. This method operates the apparatus 10 in one of a wireless mode and a USB mode (or other wired mode) without any conflict during operation. Furthermore, this method could operate the apparatus in both the wireless and USB mode without switching power off and on to change configuration. As discussed above, the apparatus 10 includes the wired interface 26 having a D− pad 262, and a D+ pad 263. The apparatus 10 also includes the switching block 20 and the controller 22 including the wireless macrocell 223 and the wired or USB macrocell 225.

The method begins (block 30) on a power-on process. This power-on process begins when the apparatus 10 is placed closely to the contact-less smart card reader or connected to a USB host. Then, at block 32, the method decides whether a wireless signal is detected during the power-on process. If the wireless signal is detected the method will operate in the wireless mode. The method then blocks the USB mode detection (at block 34), configures the apparatus 10 in wireless mode and launches a vector-reset process for the controller (block 36). Configuring the apparatus 10 in the wireless mode includes configuring the switching block 20 and configuring the wireless macrocell 223 such that the apparatus 10 could operates in the wireless mode.

On the other hand, if the wireless signal is not detected at the block 32, the method then blocks the wireless mode detection (block 38). However, in this case when the wireless signal is not detected, the method next decides whether a USB cable connection is detected after the power-on process (block 40). The USB cable connection could be detected from at least one of the D+ pad 262 and the D− pad 263 after the end of the power-on process.

The method then configures the apparatus 10 in USB mode (if the USB cable connection is detected) and launches vector-reset process for the controller (block 42). Configuring the apparatus 10 in the USB mode includes configuring the switching block 20 and configuring the wired or USB macrocell 225 such that the apparatus 10 could operate in the USB mode. In another embodiment, the switching block 20 is configured first, followed by USB cable detection, and then configuration of the USB macrocell 225. If the USB cable connection is detected and after configuration at block 42, then the method will operate a USB activation (block 44) including the USB attachment and the USB initialization.

Figure 3A:
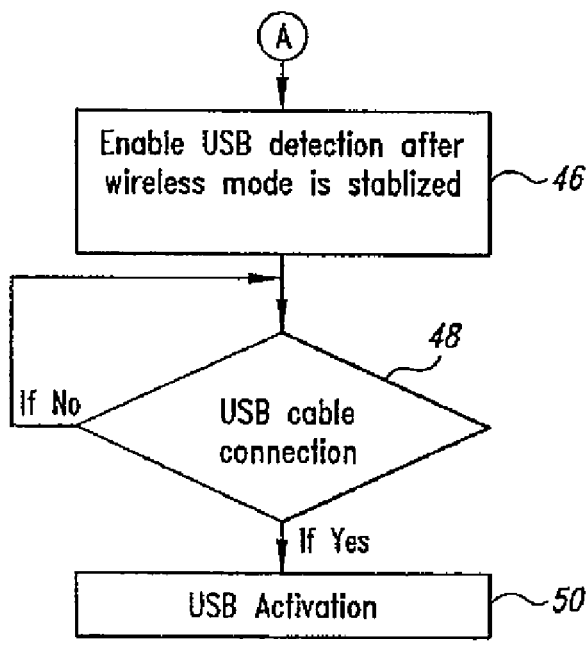
FIG. 3A is a continuing flowchart of the method of FIG. 3 to operate the apparatus in both USB mode and wireless mode when the apparatus originally operates only in the wireless mode.

As mentioned above, when the first mode is detected, there is an option to block the second mode detection until a new power-on-reset of the apparatus 10, or to block the second mode detection during the time to stabilize the apparatus 10 in the first mode and thereafter to release the block to enable the second mode detection if needed. Referring to FIG. 3A, after the wireless mode is detected and the apparatus 10 is stabilized in the wireless mode (e.g., the apparatus 10 is fully configured in the selected mode and is operating normally), the method could enable the USB mode detection (block 46). To enable the USB mode detection, the method will place the wired or USB macrocell 225 in stand-by status and enable the USB cable detection unit 163. After the USB mode detection is enabled, the method then detects whether there is a USB cable connection (block 48). If the USB cable connection is detected then the method will operate the USB activation process (block 50). There will thus now be two activated modes: wireless and wired. One of these modes is used at any one time to communicate with a host, via use of the USBREADY and RFREADY signals to verify that there is no current data transfer and/or other potential sources of conflict.

Figure 3B:
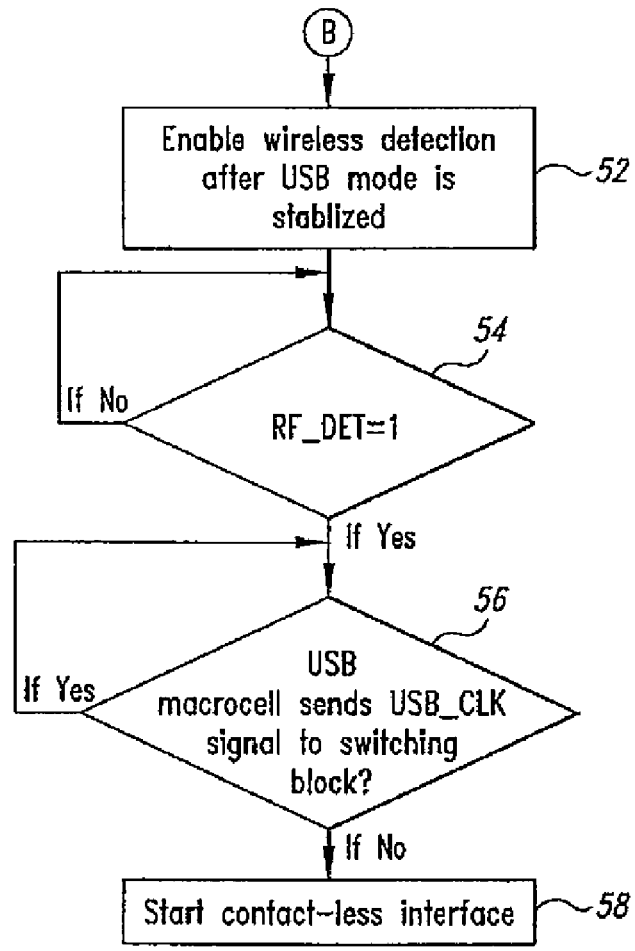
FIG. 3B is a continuing flowchart of the method of FIG. 3 to operate the apparatus in both USB mode and wireless mode when the apparatus originally operates only in the USB mode.

Referring to FIG. 3B, on the other hand, if at first the USB mode is detected and the apparatus 10 is then stabilized in USB mode, the method could enable the wireless mode detection (block 52). To enable the wireless mode detection, the method will place the wireless macrocell 223 in stand-by status and enable the output of the wireless detection circuit 14. After the wireless mode detection is enabled, the method then decides whether a wireless signal is detected (block 54). If at that time the wireless signal is detected, then the method further decides whether the wired or USB macrocell 225 is still sending the USB_CLK signal to the switching block 20 (block 56), as one embodiment switches from the USB_CLK to another oscillator before switching the switching block 20 to wireless mode. If the USB_CLK signal is no longer being used, the method will then start the contact-less interface (block 58) to allow wireless communication.

Figure 4:
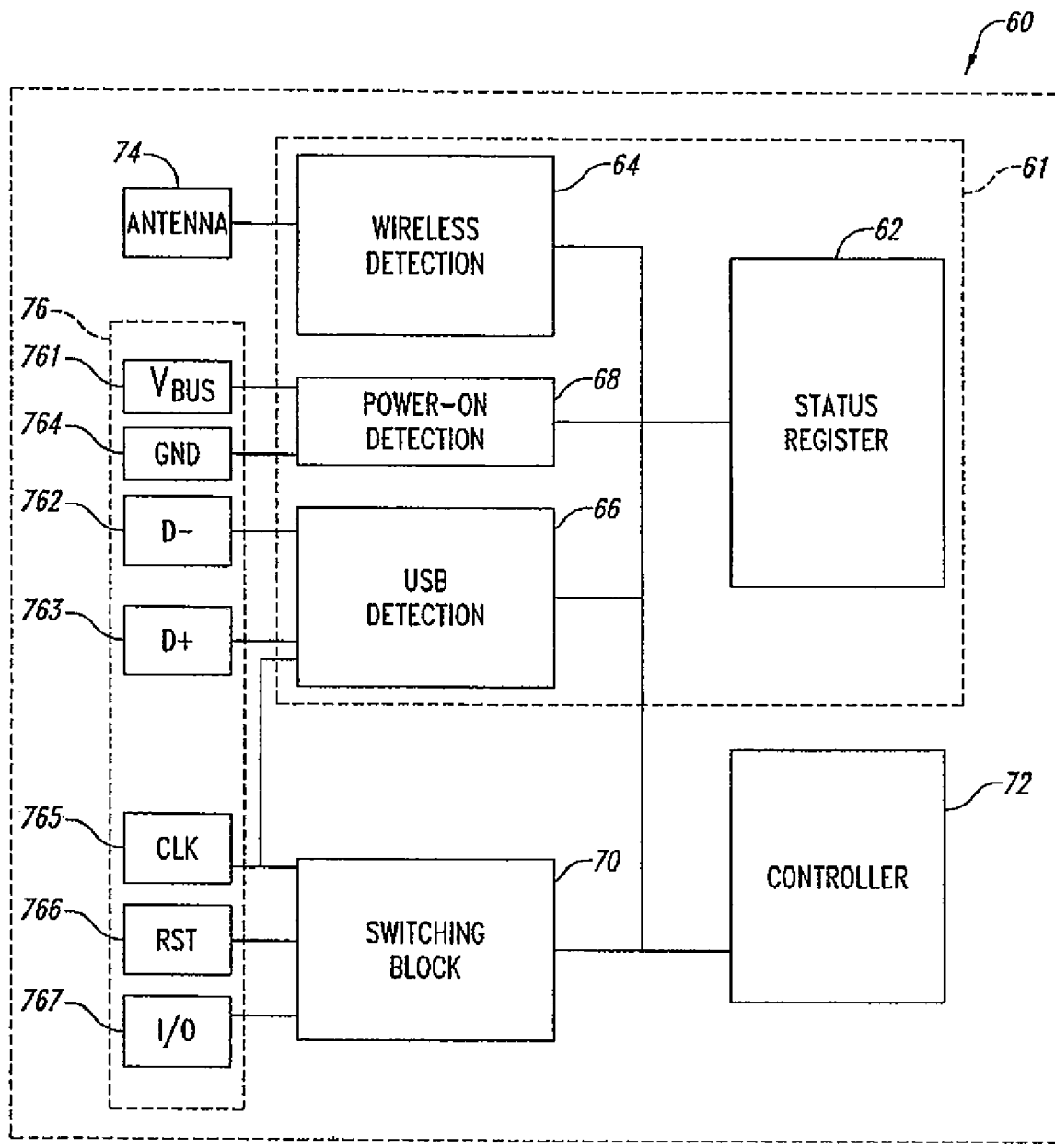
FIG. 4 is a schematic diagram of a smart card apparatus according to another embodiment of the present invention

Referring to FIG. 4, another embodiment of this invention is presented. In this embodiment the apparatus 60 operates in one of a wireless mode, a USB mode, and some other contact mode without any conflict during operation. Furthermore, the apparatus 60 could operate in either or both the wireless mode and USB mode without switching power off and on to change configuration.

Similarly, the apparatus 60 also includes a mode detection circuit 61, a switching block 70, a controller 72, an antenna 74, and a wired interface 76 comprising a plurality of pads. The antenna 74 could receive electromagnetic power and wireless signals from a contact-less smart card reader. The wired interface 76 in the embodiment includes a voltage supply pad 761, a ground pad 764, a D– pad 762 and a D+ pad 763, and a set of contact pads including a CLK pad 765, a RST pad 766, and an I/O pad 767 (or other type of contact pads). The set of the contact pads are in compliance with the ISO 7816 protocol, as one example, such that an ISO 7816 smart card reader could access the apparatus 60 through the set of contact pads. The mode detection circuit 61, connected to the antenna 74 and the wired interface 76, could detect and store a set of wireless status signals and a set of USB status signals. The controller 72 and the switching block 70, connected to each other, could operate the apparatus 60 in one of the wireless mode, the USB mode and the contact mode, or operate the apparatus 60 in both the wireless mode and the USB mode, based on the set of wireless status signals and the set of USB status signals.

The mode detection circuit 61 comprises a status register 62, a wireless detection circuit 64, a USB detection circuit 66, and a power-on detection circuit 68. The wireless detection circuit 64, coupled to the antenna 74, generates a wireless power supply signal to the power-on detection circuit 68 and the set of wireless status signals to the status register 62. The power-on detection circuit 68 connected to the wireless detection circuit 64 and the voltage supply pad 761 can generate a power-on signal. When the smart card 100 is placed closely to the contact-less smart card reader, the wireless detection circuit 64 will receive the electromagnetic power and generate the wireless power supply signal to the power-on detection circuit 68. Then, the power-on detection circuit 68 will generate the power-on signal. On the other hand, this power-on signal will also be generated when there is electric power sent through the voltage supply pad 761 to the power-on detection circuit 68. The USB detection circuit 66, coupled to the power-on detection circuit 68, the D+ pad 763, the D– pad 762 and the CLK pad 765, generates a set of USB status signals and a mode status signal. The status register 62 coupled to the wireless detection circuit 64 and the USB detection circuit 66 stores the set of wireless status signals, the set of USB status signals, and the mode status signal.

To avoid any conflicts among those modes according to one embodiment, the apparatus 60 will first detect if there is a wireless mode, and if not, then the apparatus 60 further detects if there is a USB mode or a contact mode. During the power-on process, if the mode detection circuit 61 detects a wireless signal through the antenna 74, the apparatus 60 will operate in the wireless mode. On the other hand, if the wireless signal is not detected by the mode detection circuit 61 during the power-on process, the apparatus 60 then has to decide whether it is in the USB mode or the contact mode. After the end of the power-on process, the mode detection circuit 61 will further check the CLK pad 765. If the CLK pad 765 is set to "1" and the mode detection circuit 61 detects a USB cable connection, the apparatus 60 will operate in the USB mode. In case that the CLK pad 765 is not set to "1" and the RST pad 766 is set to "1" after the power-on process, the apparatus 60 will operate in the contact mode. It is appreciated that other pad(s) may be checked to detect USB connections or other type of wired connection.

Figure 4A:
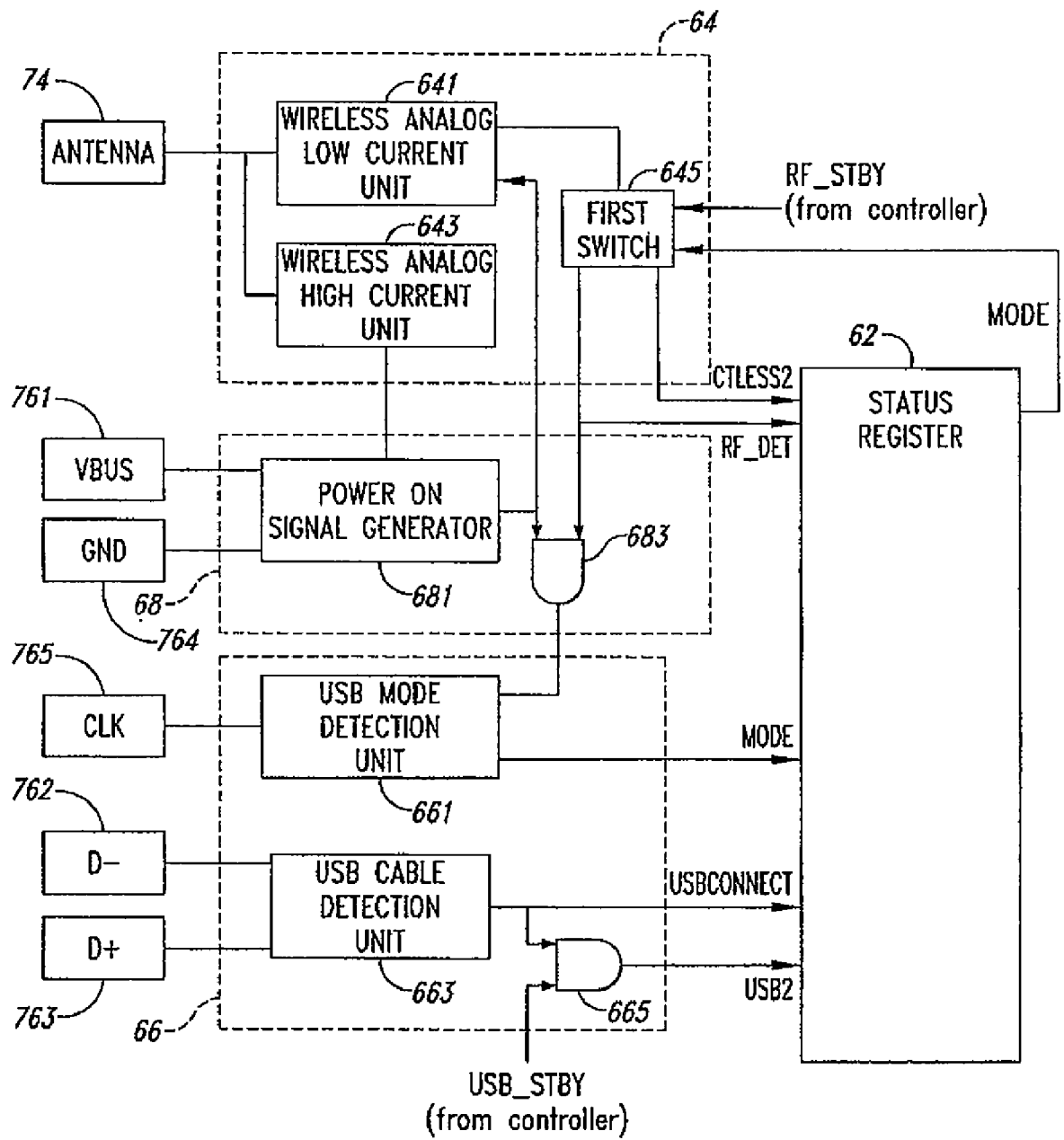
FIG. 4A is a schematic diagram of an embodiment of a mode detection circuit of the apparatus of FIG. 4.

FIG. 4A is a detailed schematic diagram of an embodiment of the mode detection circuit 61. The wireless detection circuit 64 comprises a wireless analog high current unit 643, a wireless analog low current unit 641, and a first switch 645. The wireless analog high current unit 643 coupled to the antenna 74 generates the wireless power supply signal to the power-on detection circuit 68. That is, when the smart card is placed closely to the contact-less smart card reader, the wireless analog high current unit 643 will generate the wireless power supply signal to the power-on detection circuit 68. The wireless analog low current unit 641 coupled to the antenna 74 and the power-on detection circuit 68 generates a wireless detection signal to the first switch 645. The first switch 645 coupled to the wireless analog low current unit 641 generates the set of wireless status signals including a RF_DET signal if a wireless signal was detected, and a CTLESS2 signal in another situation to indicate that the wireless interface is enabled while the smart card is in USB or other contact mode. When the wireless signal is detected during the power-on process, the RF_DET status signal is set to "1." In this case, the RF_DET signal is provided to the status register 62 via the first switch 645 to indicate that the wireless mode is detected. Thereafter, a CTLESS bit in the status register 62 is set to "1," the apparatus 60 will be configured in the wireless mode, the USB detection circuit 66 will be blocked when RF_DET signal is set to "1," and then the apparatus 60 launches a vector-reset process to initiate the state of the apparatus 60.

The power-on detection circuit 68 comprises a power-on signal generator 681 and a first logic circuit 683. The power-on signal generator 681, coupled to the wireless analog high current unit 643, could receive the wireless power supply signal and generate the power-on signal. Furthermore, the power-on signal generator 681 also couples to the voltage supply pad 761 and generates the power-on signal when it receives the electric power from the voltage supply pad 761 instead of the antenna 74. The first logic circuit 683, coupled to the power-on signal generator 681 and the first switch 645, generates a control signal to the USB detection circuit 66. The first logic circuit 683 generates the control signal based on the content of the RF_DET signal and the power-on signal. The control signal will control or block the USB mode and contact mode detection such that both modes could only be detected after the power-on process and when the RF_DET signal is not set to "1."

The USB detection circuit 66 includes a USB mode detection unit 661, a USB cable detection unit 663 and a second logic circuit 665 to generate the set of USB status signals including a first USB status signal ("USBCONNECT") and a second USB status signal ("USB2"), and to generate a mode status signal ("MODE"). The USB mode detection unit 661, coupled to the CLK pad 765 and the first logic circuit 683, generates the MODE signal. After the end of the power-on process, if the RF_DET signal="0" and the signal on the CLK pad 765 is set to "1," then the MODE signal is set to "1." The USB cable detection unit 663 coupled to the D− pad 762 and the D+ pad 763 generates the USBCONNECT signal. When a USB cable connection is detected from at least one of the D+ pad and the D− pad after the end of the power-on process, the USBCONNECT signal is set to "1." If the MODE signal is set to "1" and the USBCONNECT signal is also set to "1", then the apparatus 60 will operate in the USB mode.

On the other hand, after the end of the power-on process if the RF_DET signal is set to "0" and the signal on the CLK pad 765 is not set to "1," then the MODE signal is set to "0." If the MODE signal is set to "0" and there is a contact connection detected, the apparatus 60 will operate in the contact mode. The contact connection could be detected if there is a reset signal detected from the RST pad 766. This contact mode could be the default mode in the apparatus 60. The second logic circuit 665 couples to the USB cable detection unit 663 and the controller 70 to generate the USB2 signal.

Figure 4B:
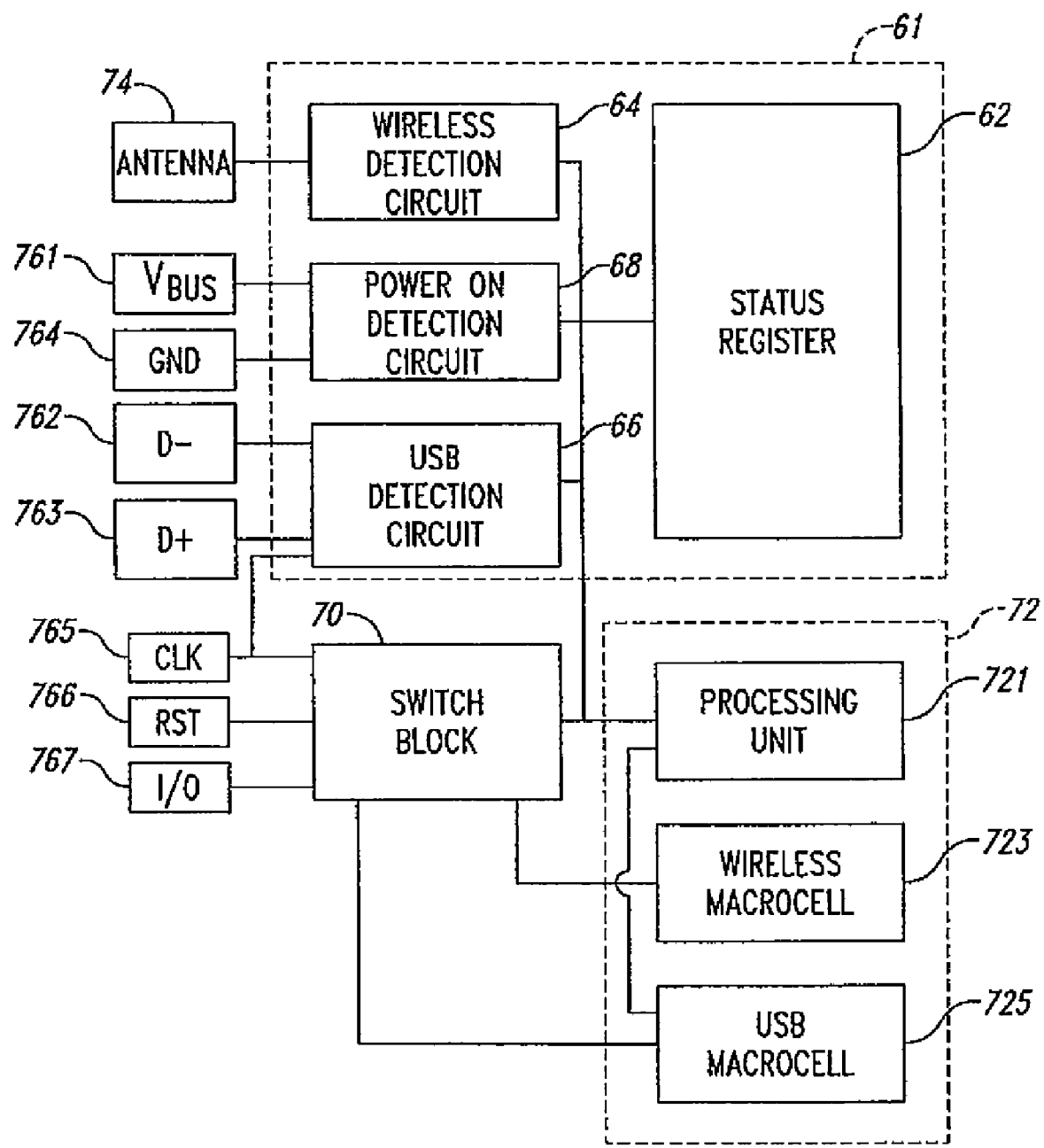
FIG. 4B is a schematic diagram of an embodiment of a switching block and a controller of the apparatus of FIG. 4.

FIG. 4B is a more detailed schematic diagram of the controller 72 and the switching block 70 according to an embodiment. The controller 72 comprises a processing unit 721, a wireless macrocell 723, and a USB macrocell 725. The switching block 70 couples to the wireless macrocell 723, the USB macrocell 725, and the set of contact pads including the CLK pad 765, the RST pad 766, and the I/O pad 767. The wireless macrocell 723 generates a set of wireless mode operation signals including CTLESS_RST, CTLESS_CLK, and CTLESS_I/O signals to the switching block 70. The USB macrocell 725 generates a set of USB mode operation signals including USB_RST and USB_CLK signals to the switching block 70. The set of the contact pads will receive a set of contact mode operation signals including a CT_RST signal, a CT_CLK signal and a CT_I/O signal from the ISO 7816 or other smart card reader to the switching block 70. If the RF_DET signal is set to "1," then the switching block 70 transmits the set of wireless mode operation signals to the processing unit 721. On the other hand, if the RF_DET signal is set to "0" and the MODE signal is set to "1", then the switching block 70 transmits the set of USB mode operation signals to the processing unit 721. Furthermore, if the RF_DET signal is set to "0" and the MODE signal is not set to "1", then the switching block 70 transmits the set of contact mode operation signals to the processing unit 721.

However, to avoid conflict among those modes, after one mode is detected, the other mode detection will be blocked. Furthermore, there is an option to block the other mode detection until a new power-on-reset of the apparatus 60, or to block the other mode detection during the time to stabilize the apparatus 60 in the first mode and thereafter to release the block to enable the other mode detection if needed. When the first mode is stabilized and confirmed, the second mode detection could be enabled again. For example, if the mode detection circuit 61 first detects the wireless mode and sets the RF_DET signal to "1," the USB detection and the contact mode detection are blocked by this RF_DET signal and then the apparatus 60 will be configured and be reset into the wireless mode. After the apparatus 60 stabilizes in the wireless mode, the mode detection circuit 61 could then enable the USB detection again. The controller 72 then will send a USB standby ("USB_STBY") signal to the USB detection circuit 66 indicating that the USB macrocell 725 is placed in a stand-by status even in the wireless mode. If at that time there is the USB cable connection and the USBCONNECT signal is set to "1," then second logic circuit 165 sets the USB2 signal to "1" showing that the USB interface is enabled in wireless mode. As before, a wireless ready ("RFREADY") signal is also sent from the wireless macrocell 723 to the switching block 70, after verifying that there is no current wireless data and before switching the switching block 70, so as to indicate that there is no conflict to activate the USB interface while in wireless mode.

On the other hand, if the mode detection circuit 61 first sets the MODE signal to "1," the wireless detection circuit 64 is blocked by this MODE signal. If the MODE signal is set to "1" and the USBCONNECT signal is also set to "1" then the apparatus 60 will be configured and be reset into the USB mode. After the apparatus 60 stabilizes in the USB mode, the apparatus 60 could then enable the wireless detection circuit 14 again. The controller 72 will then send a wireless standby ("RF_STBY") signal to the wireless detection circuit 64 showing that the wireless macrocell 723 is placed in a stand-by status even in the USB mode. If after that time the wireless signal is detected by the wireless detection circuit 64, then the first switch 645 set the CTLESS2 signal to "1" showing that the contactless interface is enabled in USB mode. As before, a USB ready ("USBREADY") signal is also sent from the USB macrocell 725 to the switching block 70, after verifying that there is no wired data currently being communicated and before switching the switching block 70, so as to indicate that there is no conflict to activate the contact-less interface in USB mode.

Figure 5:
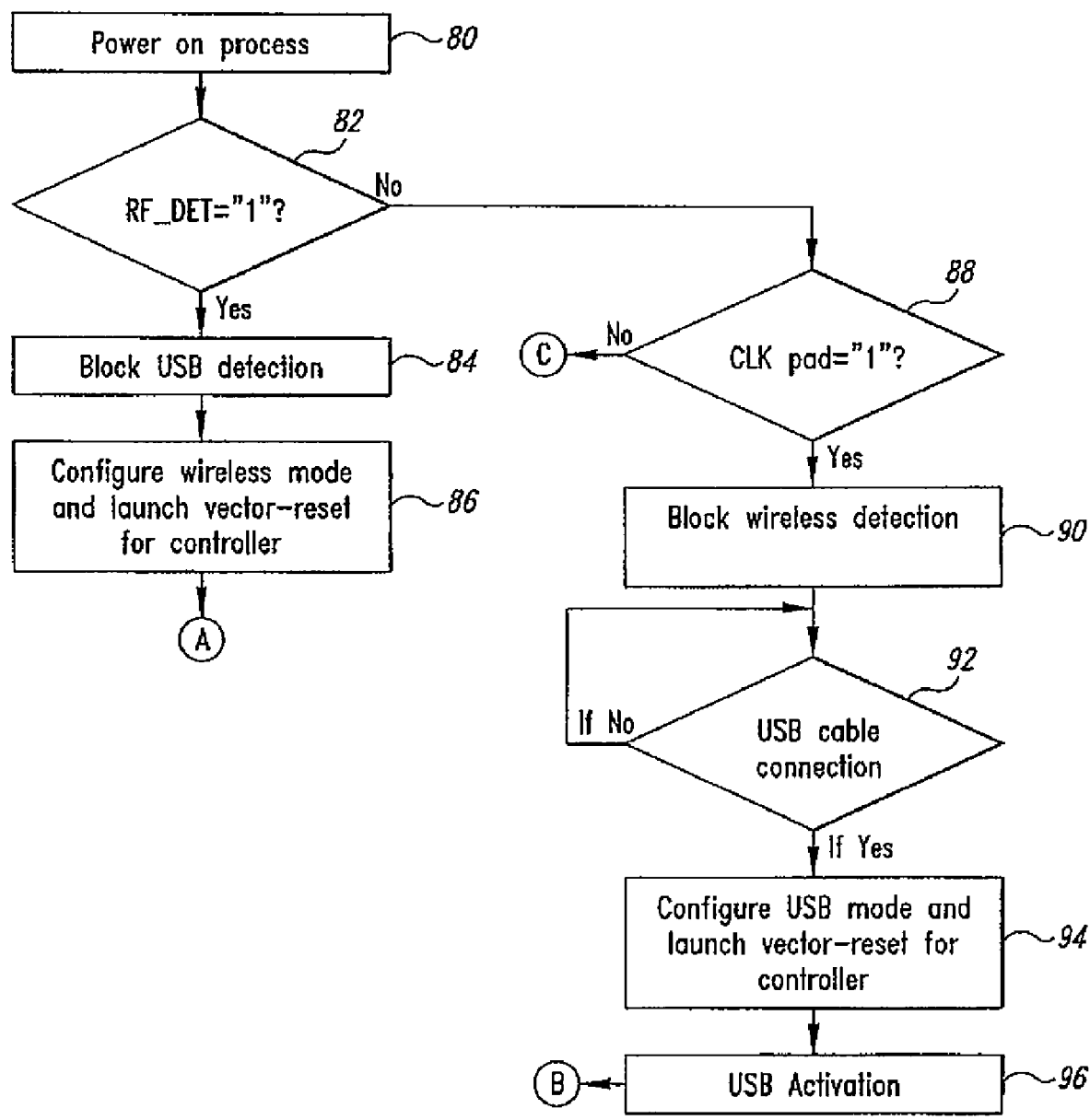
FIG. 5 is a flowchart of an embodiment of a method of operating the smart card apparatus of FIG. 4.

A method according to an embodiment of the present invention will now be discussed while referring to FIG. 5. This method operates the apparatus 60 in one of a wireless mode, a USB mode, and a contact mode without any conflict during operation. Furthermore, this method could operate the apparatus in both the wireless and wired modes without switching power off and on to change configuration. As discussed above, the apparatus 60 includes the wired interface 76 including a D− pad 762, a D+ pad 763, a CLK pad 765 and a RST pad 766. The apparatus 60 also includes the switching block 70 and the controller 72, including the wireless macrocell 723 and the USB macrocell 725.

The method begins on a power-on process (block 80). This power-on process begins when the apparatus 60 is placed closely to the contact-less smart card reader, connected to a USB host, or connected to the contact smart card reader. Then, at block 82, the method decides whether a wireless signal is detected during the power-on process. If the wireless signal is detected the method will operate in the wireless mode. The method then blocks the USB mode detection (at block 84), configures the apparatus 60 in wireless mode and launches vector-reset process for the controller (block 86).

Figure 5A:
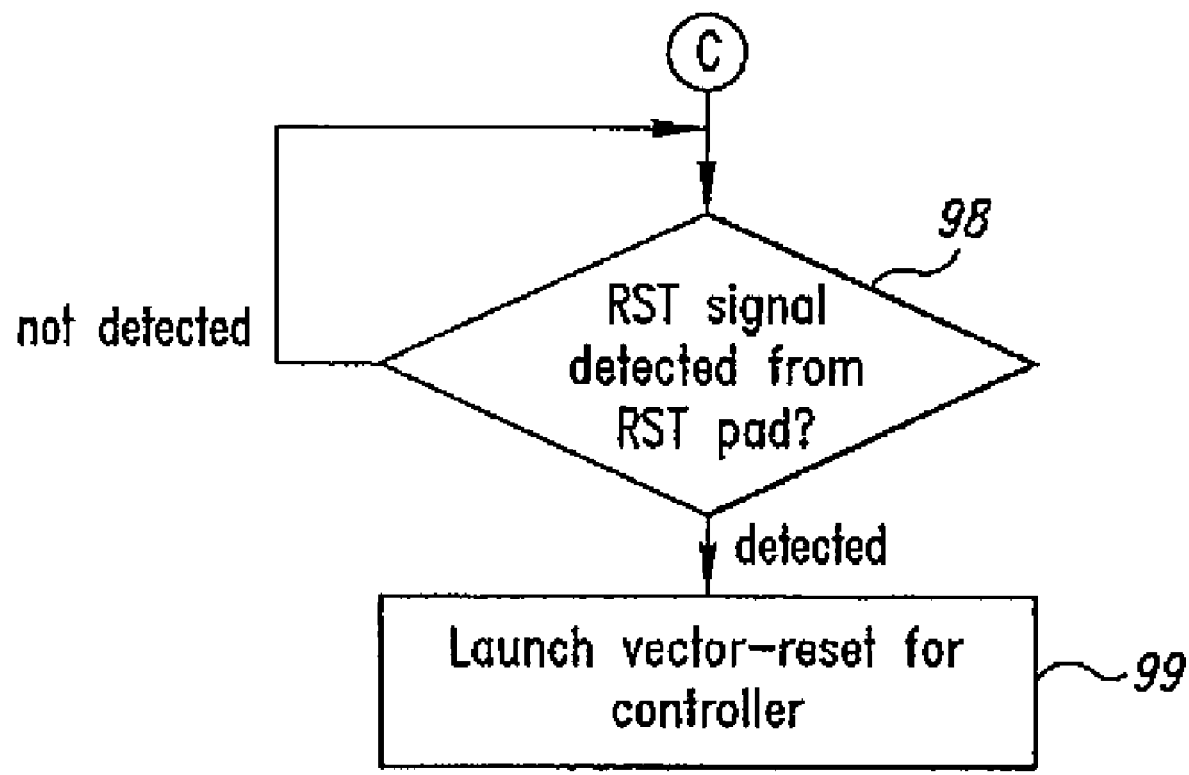
FIG. 5A is a continuing flowchart of the method of FIG. 4 to operate the apparatus in contact mode.

On the other hand, if the wireless signal is not detected at the block 82, the method further determines whether the signal on the CLK pad 765 is set to "1" (at block 88) after the end of the power-on process. If the signal on the CLK pad is set to "1," then the method blocks the wireless mode detection (at block 90), and decides whether a USB cable connection is detected (block 94). If the USB cable connection is detected, then the method configures the apparatus 60 in USB mode and launches a vector-reset process for the controller (block 94), and will operate the USB activation (block 96), with the mode signal being set to "1." In block 88, however, if the signal on the CLK pad is not set to "1" after the end of the power-on process, then the method will decide whether there is a contact connection detected. The contact connection could be detected if there is a reset signal detected from the RST pad 766 for example in an embodiment, as shown in block 98 of FIG. 5A. Alternatively or in addition, the mode signal may be set to "0" while RF_DET is "0," to indicate the possibility of some contact connection. If there is a reset signal detected, then the method will launch a vector-reset process for the controller (block 99) and the apparatus 60 then operates in the contact mode.

Similarly as a previously described embodiment, the apparatus 60 could operate in both wireless mode and the USB mode without switching power off and on to change configuration. In another embodiment, after the wireless mode is detected and the apparatus 60 is stabilized in the wireless mode, the method could enable the USB mode detection (block 46, shown in FIG. 3A). To enable the USB mode detection, the method will place the USB macrocell 625 in stand-by status. The method then detects whether there is a USB cable connection, and if the USB cable connection is detected and there is no conflict per the RFREADY signal, then the method will operate the USB activation (block 50, shown in FIG. 3A). On the other hand, if at first the USB mode is detected and the apparatus is then stabilized in USB mode, the method could enable the wireless mode detection (block 52, shown in FIG. 3B). To enable the wireless mode detection, the method will place the wireless macrocell 623 in stand-by status. After the wireless mode detection is enabled, the method then decides whether a wireless signal is detected (block 54, shown in FIG. 3B). If at that time the wireless signal is detected and there is no conflict per the USBREADY signal, then the method further decides whether the USB macrocell 625 still sends the USB_CLK signal to the switching block 60 (block 56, shown in FIG. 3B). If there is no the USB_CLK signal still being sent from the USB macrocell 625 to the switching block 60, the method will then start the contact-less interface.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention. These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for an integrated circuit card, comprising:
 maintaining the integrated circuit card in a power-on state;
 detecting availability of a first communication mode using a first transfer interface;
 asserting a first communication mode signal indicative of the detected availability of the first communication mode;
 blocking detection of availability of a second communication mode in cooperation with the first communication mode signal;
 transmitting data from the integrated circuit card according to the first communication mode using the first transfer interface within the integrated circuit card;
 unblocking detection of availability of the second communication mode after communication according to the first mode has stabilized;
 detecting availability of the second communication mode using a second transfer interface after initiating the transmitting of data in the first communication mode while continuing to maintain the integrated circuit card in the power-on state; and
 transmitting data from the integrated circuit card according to the second communication mode using the second transfer interface within the integrated circuit card while continuing to maintain the integrated circuit card in the power-on state.

2. The method of claim 1, further comprising:
 terminating the transmitting of data according to the first communication mode.

3. The method of claim 2, further comprising:
 terminating the transmitting of data according to the second communication mode; and
 re-initiating communication according to the first communication mode.

4. The method according to claim 1 wherein transmitting data from the integrated circuit card according to the first communication mode includes transmitting data according to a wireless protocol and detecting availability of the second communication mode includes detecting availability of a wired protocol.

5. The method according to claim 4 wherein detecting availability of the wired protocol includes detecting availability of a USB protocol.

6. The method according to claim 4 wherein detecting availability of the wired protocol includes detecting availability of an ISO-7816 protocol.

7. The method according to claim 1 wherein transmitting data from the integrated circuit card according to the first communication mode includes transmitting data according to a wired protocol and detecting availability of the second communication mode includes detecting availability of a wireless protocol.

8. The method according to claim 7 wherein transmitting data from the integrated circuit card according to the first communication mode includes transmitting data according to a USB protocol.

9. The method of claim 1 wherein the blocking detection of availability of the second communication mode is affected for a predetermined amount of time.

10. The method of claim 1 wherein the unblocking detection of availability of the second communication mode is affected by de-asserting the first communication mode signal.

11. The method of claim 1 further comprising
 blocking detection of availability of a third communication mode in cooperation with the first communication mode signal and a second communication mode signal;
 unblocking detection of availability of the third communication mode after communication according to the first mode has stabilized;

detecting availability of the third communication mode using a third transfer interface after initiating the transmitting of data in the first communication mode while continuing to maintain the integrated circuit card in the power-on state; and transmitting data from the integrated circuit card according to the third communication mode using the third transfer interface within the integrated circuit card while continuing to maintain the integrated circuit card in the power-on state.

12. The method of claim 11 wherein the first communication mode is a wireless mode, the second communication mode is a USB mode, and the third communication mode is an ISO-7816 mode.

13. An apparatus for an integrated circuit card, comprising:
a housing;
a wireless interface in the housing;
a wired interface in the housing;
a detection circuit coupled to the wireless interface and the wired interface, said detection circuit configured to detect both a wireless communication mode and a wired communication mode after a single power-on reset and after communicating via one of the wireless communication mode or the wired communication mode;
a blocking circuit coupled to the controller and the detection circuit, said blocking circuit configured to block detection of the wireless communication mode after detection of the wired communication mode;
a release circuit coupled to the controller and the detection circuit, said release circuit configured to re-enable detection of the wireless communication mode; and
a controller configured to switch between and operate according to both communication according to the wireless communication mode and communication according to the wired communication mode after the single power-on reset.

14. The apparatus according to claim 13 wherein said controller is further configured to communicate according to the wireless communication mode via the wireless interface and to communicate according to the wired communication mode via the wired interface.

15. The apparatus according to claim 13, further comprising:
an ISO-7816 circuit coupled to the wired interface, said ISO-7816 circuit configured according an ISO-7816 standard.

16. The apparatus according to claim 13, further comprising:
a USB circuit coupled to the wired interface, said USB circuit configured according a USB standard.

17. The apparatus according to claim 13, further comprising:
a switching block circuit coupled to the mode detection circuit and the controller, said switching block circuit configured to pass a set of communication mode signals based on a communication mode detected by the detection circuit.

18. An apparatus for an integrated circuit card, the apparatus comprising:
a first detection circuit to detect presence of a wireless connection to the integrated circuit card;
a second detection circuit to detect presence of a wired connection to the integrated circuit card;
a blocking circuit to block the detection of the wireless mode when the presence of the wired mode is detected and to block the detection of the wired mode when the presence of the wireless mode is detected;
a release circuit to unblock the detection of both the wireless mode and the wired mode;
a switching block coupled to the first and second detection circuits to generate a first signal that corresponds to a type of connection detected by one of the detection circuits; and
a controller coupled to the switching block and the release circuit, the controller responsive to the first signal to allow operation of the integrated circuit card in a first mode that corresponds to the type of connection detected, and to subsequently unblock the integrated circuit card to support a second mode that corresponds to a second signal provided by the switching block and to automatically allow operation of the integrated circuit card in the second mode in response to the second signal wherein both the first mode and the second mode are operable after the apparatus has performed a single reset.

19. The apparatus of claim 18 wherein the wired connection includes at least one of a USB-compliant connection and an ISO-compliant contact connection.

20. The apparatus of claim 18 wherein the wireless or wired connections each include a plurality of different types of protocol connections that are supported by the integrated circuit card.

21. A method for an integrated circuit card, comprising:
initializing the integrated circuit card during a single power-on reset condition;
transitioning the integrated circuit card to an after-power-on reset condition and maintaining the integrated circuit card in a power-on state during the after-power-on reset condition;
determining whether a first signal of a first communication protocol is detected;
operating the integrated circuit card according to the first communication protocol, wherein operating the integrated circuit card according to the first communication protocol includes:
blocking a second communication protocol if the first signal is detected during the power-on reset condition; and
unblocking the second communication protocol after transitioning the integrated circuit card to the after-power-on reset condition;
determining whether a second signal of the second communication protocol is detected after operating the integrated circuit card according to the first communication protocol and while remaining in the after-power-on reset condition and maintaining the integrated circuit card in the power-on state; and
switching from operating the integrated circuit card according to the first communication protocol to operate the integrated circuit card according to the second communication protocol while remaining in the after-power-on reset condition and maintaining the integrated circuit card in the power-on state.

22. The method of claim 21, further comprising:
automatically allowing operation of the integrated circuit card according to the first communication protocol during operation of the integrated circuit card according to the second communication protocol.

23. The method in claim 21 wherein operating the integrated circuit card according to the first communication protocol includes activating a wireless communication circuit and operating the integrated circuit card according to the second communication protocol includes activating a wired communication circuit.

24. The method in claim 23 wherein activating the wired communication circuit includes complying with a USB protocol.

25. The method in claim 21 wherein operating the integrated circuit card according to the first communication protocol includes activating a wired communication circuit, and wherein operating the integrated circuit card according to the second communication protocol includes activating a wireless communication circuit.

26. The method in claim 25 wherein activating the wired communication circuit includes complying with a USB protocol.

27. An apparatus for an integrated circuit card, comprising:
means for initializing the integrated circuit card during a power-on reset condition and for transitioning the integrated circuit card to an after-power-on reset condition while maintaining the integrated circuit card in a power-on state;
means for determining whether a first signal of a first communication protocol is detected while remaining in the after-power-on reset condition and while maintaining the integrated circuit card in the power-on state;
means for operating the integrated circuit card according to the first communication protocol;
means for determining whether a second signal of a second communication protocol is detected after operating the integrated circuit card according to the first communication protocol and while remaining in the after-power-on reset condition and while maintaining the integrated circuit card in the power-on state; and
means for switching from operating the integrated circuit card according to the first communication protocol to operate the integrated circuit card according to the second communication protocol while remaining in the after-power-on reset condition and while maintaining the integrated circuit card in the power-on state,
wherein said means for operating the integrated circuit card according to the first communication protocol includes means for blocking the second communication protocol if the first signal is detected during the power-on reset condition and unblocking the second communication protocol after transitioning the integrated circuit card to the after-power-on reset condition.

28. The apparatus of claim 27, further comprising:
means for passing a set of communication protocol signals based on a type of communication protocol detected.

29. The apparatus of claim 27 wherein said means for operating the integrated circuit card according to the first communication protocol includes:
means for blocking the second communication protocol if the first signal is detected during the power-on reset condition and unblocking the second communication protocol after transitioning the integrated circuit card to the after-power-on reset condition.

* * * * *